United States Patent
Shapiro

[15] 3,673,223
[45] June 27, 1972

[54] 6-THIOCYANATO-16-METHYLENE-4,6-PREGNADIENES, METHODS FOR THEIR MANUFACTURE, AND INTERMEDIATES THEREOF

[72] Inventor: Elliot L. Shapiro, Cedar Grove, N.J.
[73] Assignee: Schering Corporation, Bloomfield, N.J.
[22] Filed: March 31, 1971
[21] Appl. No.: 129,949

[52] U.S. Cl..................260/397.4, 424/243, 260/239.55
[51] Int. Cl......................................C07c 169/32
[58] Field of Search................... Machine Searched Steroids

[56] References Cited

UNITED STATES PATENTS
3,407,217  10/1968  Hughes et al. ...................260/397.4

*Primary Examiner*—Elbert L. Roberts
*Attorney*—Stephen B. Coan and Mary S. King

[57] ABSTRACT

6-Thiocyanato-16-methylene-17α-lower alkanoyloxy-4,6-pregnadiene-3,20-diones having progestational and anti-androgenic activities are prepared from 6β-thiocyanato-7α-hydroxy-16-methylene-17α-lower alkanoyloxy-4-pregnene-3,20-diones by treatment in a tertiary amine with a hydrocarbonsulfonyl halide having up to seven carbon atoms. The 6-thiocyanato-16-methylene-4,6-pregnadienes of this invention are also prepared by treating a 6β-thiocyanato-7α-hydroxy-16-methylene-17α-lower alkanoyloxy-4-pregnene-3,20-dione or a 7-lower alkanoate ester thereof with an acid selected from the group consisting of p-toluenesulfonic acid or hydrochloric acid in a non-reactive, organic solvent.

11 Claims, No Drawings

6-THIOCYANATO-16-METHYLENE-4,6-PREGNADIENES, METHODS FOR THEIR MANUFACTURE, AND INTERMEDIATES THEREOF

FIELD OF INVENTION

This invention relates to novel compositions of matter, to methods for their manufacture, and to novel intermediates useful therein.

More specifically, this invention relates to novel 6-thiocyanato-16-methylene-17α-lower alkanoyloxy-4,6-pregnadiene-3,20-diones having progestational and anti-androgenic activity, to methods for their manufacture and to novel intermediates useful therein, i.e. to 6β-thiocyanato-7α-hydroxy-16-methylene-17α-lower alkanoyloxy-4-pregnene-3,20-diones and their 7-lower alkanoate esters.

SUMMARY OF INVENTION

The invention sought to be patented in a composition-of-matter aspect resides in the concept of a chemical compound having progestational and anti-androgenic activity which has a molecular structure comprising a 4,6-pregnadiene-3,20-dione nucleus with a thiocyanato group at C–6, a methylene group at C–16 and an α-lower alkanoyloxy group at C–17. The preferred compound is that having a 17α-acetoxy group.

The invention sought to be patented in another composition-of-matter aspect resides in the concept of a chemical compound useful as an intermediate which has a molecular structure comprising a 4-pregnene-3,20-dione nucleus with a α-thiocyanato group at C–6, an α-hydroxy group or a lower alkanoate ester thereof at C–7, a methylene group at C–16, and an α-lower alkanoyloxy group at C–17.

The invention sought to be patented in a process aspect of this invention resides in the concept of treating a 6β-thiocyanato-7α-hydroxy-16-methylene-17α-lower alkanoyloxy-4-pregnene-3,20-dione in a tertiary amine with a hydrocarbonsulfonyl halide having up to seven carbon atoms whereby is produced a 6-thiocyanato-4,6-pregnadiene-3,20-dione of this invention having progestational and anti-androgenic activity. A preferred species of this process aspect is that wherein the tertiary amine is pyridine and the hydrocarbonsulfonyl halide is methanesulfonyl chloride.

The invention sought to be patented in another process aspect of this invention resides in the concept of treating a member selected from the group consisting of a 6β-thiocyanato-7α-hydroxy-16-methylene-17α-lower alkanoyloxy-4-pregnene-3,20-dione and a 7-lower alkanoate ester thereof with an acid reagent selected from the group consisting of p-toluenesulfonic acid and hydrochloric acid in an inert solvent.

GENERAL DESCRIPTION OF THE INVENTION

COMPOSITION-OF-MATTER ASPECT

Included among the physical embodiments of the progestationally active composition-of-matter aspect of this invention are 6-thiocyanato-16-methylene-17α-lower alkanoyloxy-4,6-pregnadiene-3,20-diones having the following structural Formula I:

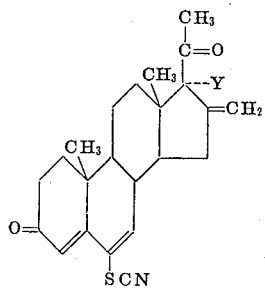

I wherein Y is lower alkanoyloxy.

The lower alkanoyloxy groups are preferably derived from lower alkanoic acids having up to eight carbon atoms including acetic, propionic, n-butyric, iso-butyric, tri-methyl acetic, valeric, iso-valeric, caproic, and caprylic acid.

Included among the 17α-lower alkanoyloxy compounds of this invention are:
6-thiocyanato-16-methylene-17α-acetoxy-4,6-pregnadiene-3,20-dione (preferred compound of this invention),
6-thiocyanato-16-methylene-17α-propionyloxy-4,6-pregnadiene-3,20-dione, 6-thiocyanato-16-methylene-17α-valeryloxy-4,6-pregnadiene-3,20-dione, and
6-thiocyanato-16-methylene-17α-caproyloxy-4,6-pregnadiene-3,20-dione.

The physical embodiments of the 6-thiocyanato-6-dehydroprogesterones of Formula I are characterized by being crystalline solids usually off-white to white in color which are insoluble in water and soluble in most organic solvents, although of limited solubility in dialkyl esters and aliphatic hydrocarbons.

The 6-thiocyanato-16-methylene-17α-lower alkanoyloxy-6-dehydroprogesterones defined by Formula I may be used as a medicament in conditions requiring a progestational agent, e.g. fertility control and in the management of various menstrual disorders. Also, in the veterinary field, the compounds of Formula I may be used to establish estrus synchronization of large farm animals, e.g. the cow and the sheep, making these compounds of particular use when breeding farm animals. These compounds may be administered via the intramuscular route in a manner similar to that in which known progestational agents, e.g. progesterone, are administered, the dosage depending on the age and size of animal or patient and on the nature and severity of the illness being treated. The progestational activity of compounds of Formula I is demonstrated by studies in the rabbit via the intramuscular route by the well known Clauberg method. For example, in this test, 6-thiocyanato-16-methylene-17α-acetoxy -4,6-pregnadiene-3,20-dione is about 12 times as active as progesterone via the intramuscular route.

The compounds of Formula I are also useful in the treatment of disorders requiring anti-androgen therapy such as in the treatment of acne or benign prostatic hypertrophy. The anti-androgen activity of compounds of Formula I is studied in the intact male immature rat by the test described by R.O. Neri, et al. Eur. J. Pharm. 1, 438–444 (1967) (Section 2.1.2, page 439). It was demonstrated, for example, that at doses as low as 1 mgm./kgm. administered subcutaneously in sesame oil, anti-androgenic activity was exhibited by the preferred compound of this invention, i.e. 6-thiocyanato-16-methylene-17-α-acetoxy4,6-pregnadiene-3,20-dione.

GENERAL DESCRIPTION OF 6β-THIOCYANATO-7α-OXYGENATED PROGESTERONE

INTERMEDIATES OF THE INVENTION

The physical embodiment of another composition-of-matter aspect of this invention include 6β-thiocyanato-7α-hydroxy progesterones and 7-lower alkanoates thereof useful as intermediates in preparing the pharmacologically active 6-thiocyanato-6-dehydroprogesterones of this invention, said compounds being defined by Formula II hereinbelow:

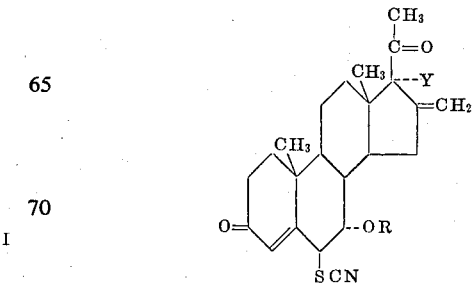

II wherein R is a member selected from the group consisting of hydrogen and lower alkanoyl and Y is lower alkanoyloxy.

Typical intermediates of Formula II include compounds such as 6β-thiocyanato-7α-hydroxy-16-methylene-17α-acetoxy progesterone (i.e. 6β-thiocyanato-7α-hydroxy-16-methylene-17α-acetoxy-4-pregnene-3,20-dione, a preferred intermediate of this invention), and the 7-acetate ester thereof, 6β-thiocyanato-7α-hydroxy-16-methylene-17α-propionyloxy-4-pregnene-3,20-dione and the 7α-acetate ester thereof,
6β-thiocyanato-7α-hydroxy-16-methylene-17α-valeryloxy-4-pregnene-3,20-dione and the 7α-acetate and 7α-valerate esters thereof, and
6β-thiocyanato-7α-hydroxy-16-methylene-17α-caproyloxy-4-pregnene-3,20-dione and the 7α-acetate, 7α-propionate and 7α-caproate esters thereof.

The physical embodiments of the compounds defined by Formula II are characterized by being crystalline solids, usually off-white to white in color, and soluble in chlorinated hydrocarbons, acetone, and lower alkyl alcohols, e.g. methanol.

The 6β-thiocyanato-7α-hydroxy-4-pregnene-3,20-diones of Formula II are conveniently derived from the corresponding 6α,7α-oxido derivatives which in turn are prepared by known procedures from 16-methylene-17α-hydroxy-4,6-pregnadiene-3,20-dione by esterification thereof such as with a lower alkanoic acid together with trifluoroacetic anhydride and p-toluenesulfonic acid to produced the corresponding 6α,7α-oxido-17-lower alkanoyloxy-4,6-pregnadiene-3,20-dione followed by epoxidation of the 6,7-double bond by means of peracids such as perphthalic acid whereby is produced the desired 6α, 7α-oxido-17α-lower alkanoyloxy-4-pregnene-3,20-dione. Thus, for example, esterification of 16-methylene-17α-hydroxy-4,6-pregnadiene-3,20-dione with a reagent mixture comprising acetic acid and trifluoroacetic anhydride and p-toluene sulfonic acid yields 16-methylene-17α-acetoxy-4,6-pregnadiene-3,20-dione which upon treatment with perphthalic acid according to known procedures yields 6α, 7α-oxido-16-methylene-17α-acetoxy-4-pregnene-3,20-dione. The 6α, 7α-oxido intermediate is the converted to a compound of Formula II by treatment with an alkali metal thiocyanate (e.g. potassium thiocyanate) in a non-reactive, organic solvent, preferably a lower alkanol in which acetic acid and water is present e.g. aqueous methanol in the presence of acetic acid) under mild conditions utilizing techniques known in the art to obtain the 6β-thiocyanato-7α-hydroxy-4-pregnene-3,20-diones of Formula II. Thus, for example, 6α,7α-oxido-16-methylene-17α-acetoxy-4-pregnene-3,20-dione treated with potassium thiocyanate in aqueous methanol in the presence of acetic acid at room temperature for 48 hours is converted to 6β-thiocyanato-7α-hydroxy-16-methylene-17α-acetoxy-4-pregnene-3,20-dione.

The compounds of Formula II wherein R is lower alkanoyl are derived from the corresponding compounds of Formula II wherein R is hydrogen by utilizing standard esterification techniques under basic conditions such as that of utilizing acetic anhydride in pyridine. Thus, treatment of the aforedescribed 6β-thiocyanato-7α-hydroxy-16-methylene-17α-acetoxy-4-pregnene-3,20-dione (a compound of Formula II wherein R is hydrogen) with acetic anhydride in pyridine at room temperature yields 6β-thiocyanato-7α, 17α-diacetoxiacetoxy-16-methylene-4-pregnene-3,20-dione (a compound of Formula II wherein R is acetyl).

PROCESS ASPECTS OF THE INVENTION

The process aspect of this invention provides a method for preparing the pharmacologically active 6-thiocyanato-16-methylene-17α-lower alkanoyloxy-4,6-pregnadienes of Formula I and resides in the concept of treating a corresponding 6β-thiocyanato-7α-hydroxy-16-methylene-17α-lower alkanoyloxy-4,6-pregnadiene-3,20-dione of Formula II with a hydrocarbonsulfonyl halide having up to seven carbon atoms in a tertiary amine.

Tertiary amines useful as solvents in this reaction include 2-methylpyridine, triethylamine, and preferably pyridine.

Hydrocarbonsulfonyl halides contemplated for use in this process include acylbromide and acylchloride derivatives of benzenesulfonic acid, methanesulfonic acid and p-toluenesulfonic acid. Preferred are the hydrocarbonsulfonyl chlorides, particularly p-toluenesulfonyl chloride and methanesulfonyl chloride.

A preferred species of this process aspect is that utilizing a hydrocarbonsulfonyl chloride (usually p-toluenesulfonyl chloride or, preferably methanesulfonyl chloride) in tertiary amine (preferably pyridine). This preferred method is of particular value when carried out on a 6 β-thiocyanato-7α-hydroxy-16-methylene-17α-acetoxy-4-pregnene-3,20-dione whereby is prepared a preferred compound of this invention, i.e. 6-thio cyanato-16-methylene-17α-acetoxy-4,6-pregnadiene-3,20-dione.

The physical embodiment of the preferred method of this process is usually carried out by suspending or dissolving a 6β-thiocyanato-7α-hydroxy-16-methylene-17α-lower alkanoyloxy progesterone e.g. 6β-thiocyanato-7α-hydroxy-16-methylene-17β-acetoxyprogesterone) in pyridine, adding a hydrocarbonsulfonyl chloride (e.g. methanesulfonyl chloride) (2 moles sulfonyl chloride per mole of steroid usually being employed), and allowing the reaction mixture to remain at temperatures in the range of from about 0° C to about 40° C (preferably at ambient temperatures) for about 20 hours or until a thin layer chromatogram of an aliquot of the reaction mixture indicates an absence of 6β-thiocyanato-7α-hydroxy starting compound. The resulting 6-thiocyanato-16-methylene-17α-lower alkanoyloxy-6-dehydroprogesterone (e.g. 6-thiocyanato-16-methylene-17α-acetoxy-4,6-pregnadiene-3,20-dione) is then easily isolated by pouring the reaction mixture into ice water, stirring until the insoluble fraction separates as a solid, collecting the insoluble fraction by filtration or extraction, and purifying using known methods such as crystallization or via chromatographic techniques.

The necessary 6β-thiocyanato-7α-hydroxyprogesterone intermediates for this process (e.g. 6β-thiocyanato-7α-hydroxy-16-methylene-17α-acetoxy-4-pregnene-3,20dione) are novel compounds of Formula II which are prepared from the corresponding 6α, 7α-oxido derivatives (known in the art) as described hereinabove. When carrying out the preferred method of this process, I have found it most convenient to prepare the preferred intermediate by reacting 6α, 7α-oxido-16-methylene-17α-acetoxy progesterone with potassium thiocyanate in aqueous methanol in the presence of acetic acid.

In another process aspect of this invention, there is provided another method for preparing the pharmacologically active 6-thiocyanato-16-methylene-17α-lower alkanoyloxy-4,6-pregnadiene-3,20-diones of Formula I and resides in the concept of treating a member selected from the group consisting of a 6β-thiocyanato-7α-hydroxy-16-methylene-17α-lower alkanoyloxy progesterone and a 6β-thiocyanato-7α-hydroxy-16-methylene-17α-lower alkanoyloxy progesterone and a 6β-thiocyanato-17-bis-lower alkanoyloxy--16-methyleneprogesterone with an acid such as hydrochloric acid or p-toluenesulfonic acid in a non-reactive, organic solvent.

When carrying out the physical embodiment of this process aspect, by "non-reactive, organic solvent" is contemplated an organic solvent in which the 6α-thiocyanato-7α-hydroxy steroid intermediate or 7α-lower alkanoate thereof and the acid reagent are soluble, as well as a solvent, which will not react with the acid or steroid substrate under the conditions of the reaction so as to cause transformations which will result in the occurrence of competing side reactions. Included among the non-reactive, organic solvents contemplated when an acid such as p-toluene sulfonic acid or hydrochloric acid are used as dehydrating agents are halogenated hydrocarbons including methylene chloride, carbon tetrachloride and, preferably, chloroform; acetone; aqueous dioxane; lower alkanoic acids, preferably acetic acid; and solvent mixtures such as lower alkanoic acids (e.g. acetic acid) and acetone.

The hydrochloric acid employed in this process may be anhydrous hydrogen chloride or may be aqueous hydrochloric acid of which concentrated hydrochloric acid is preferred.

When anhydrous hydrogen chloride is employed, preferred solvents are halogenated hydrocarbons, particularly chloroform. When concentrated aqueous hydrochloric acid is used as dehydrating agent, included among the non-reactive, organic solvents which are conveniently employed are acetone or aqueous dioxane.

The 6β-thiocyanato-7α-hydroxy-16-methylene-17α-lower alkanoyloxyprogesterones and 6β-thiocyanato-7α, 17α-di-lower alkanoyloxy-16-methyleneprogesterones, necessary intermediates in this process, are novel compounds of Formula II described hereinabove.

The physical embodiment of this process aspect of my invention is usually carried out by dissolving or suspending a 6β-thiocyanato-7α-hydroxyprogesterone or 7α-lower alkanoate thereof (e.g., 6β-thiocyanato-7α-hydroxy-16-methylene-17α-acetoxy-4-pregnene-3,20-dione or 7α, 17α-di-acetoxy-16-methylene-4-pregnene-3,20-dione) in a large volume of solvent (e.g. preferably chloroform in ratios of about 1 part steroid to 100 parts chloroform) and adding the acid reagent (e.g. preferably p-toluenesulfonic acid) in amounts comprising about 0.25 moles acid per mole steroid, and allowing the reaction mixture to remain at temperatures in the range of from about 0° C to about 40° C (preferably ambient temperatures) for about 3 days or until a thin layer chromatogram of an aliquot of the reaction mixture indicates the absence of 6β-thiocyanato-7α-hydroxyprogesterone or of 6β-thiocyanato-7α-lower alkanoyloxyprogesterone starting steroid. The resulting 6-thiocyanato-4,6-pregnadiene (e.g. 6-thiocyanato-16-methylene-17α-acetoxy-4,6-pregnadiene- 3,20-dione) is then conveniently isolated via separation of products on preparative thin layer chromatographic plates utilizing procedures known in the art.

My invention is further described in the following examples which are set forth for illustrative purposes only. It will be understood the invention is not to be construed as limited in scope by the details set forth therein, since modifications and equivalents both in materials and methods will be apparent from the disclosure to those skilled in the art.

EXAMPLE 1

6-thiocyanato-16-methylene-17α-acetoxy-4,6-pregnadiene-3,20-dione (6-thiocyanato-16-methylene-17α-acetoxy-6-dehydroprogesterone)

A. 6β-Thiocyanato-7α-hydroxy-16-methylene-17α-acetoxy-4-pregnene-3,20-dione (6β-thiocyanato-7α-hydroxy-16-methylene-17-acetoxyprogesterone)

To a solution of 1 g. of 6α, 7α-oxido-16-methylene-17α-acetoxy-4-pregnene-3,20-dione in 160 ml. of methanol, add a solution of 6 g. of potassium thiocyanate in 40 ml. of water and 1 ml. of acetic acid. Allow the reaction mixture to remain at room temperature for 48 hours, then pour the reaction mixture into 800 ml. of water, extract the aqueous reaction mixture with chloroform, and dry the combined chloroform extracts over magnesium sulfate. Distill the chloroform solution in vacuo to a residue comprising 6β-thiocyanato-7α-hydroxy-16-methylene-17α-acetoxy-4-pregnene-3,20-dione. Purify the residue by crystallization from ethyl acetate to obtain 882 mg. (77percent theoretical yield) of 6β-thiocyanato-7α-hydroxy-16-methylene-17α-acetoxy-4-pregnene-3,20-dione, $[\alpha]_D^{25}=$ −23.0° (dioxane); $\lambda_{max}^{methanol}$ 241 $\mu$ ($\epsilon$=13,637).

B. 6-Thiocyanato-16-methylene-17α-acetoxy-4,6-pregnadiene-3,20-dione

Add 40 drops of methanesulfonyl chloride to a solution of 700 mg. of 6β-thiocyanato-7α-hydroxy-16-methylene-17α-acetoxy-4-pregnene-3,20-dione in 20 ml. of pyridine cooled in an ice bath. Allow the reaction mixture to remain at room temperature for 20 hours, then pour into 150 ml. of ice water. Stir for 30 minutes, then collect the resulting precipitate by filtration and dry the precipitate to obtain 616 mg. of solid comprising 6-thiocyanato-16-methylene-17α-acetoxy-4,6-pregnadiene-3,20-dione, $[\alpha]_D^{25}=$ −122.5° (dioxane).

EXAMPLE 2

Alternate Procedure for Preparing 6-Thiocyanato-16-methylene-17α-acetoxy-4,6-pregnadiene-3,20-dione A. 6β-Thiocyanato-7α, 17α-di-acetoxy-16-methylene-4-pregnene-3,20-dione Add 0.5 ml. of acetic anhydride to an ice-cooled solution of 574 mgm. of 6β-thiocyanato-7α-hydroxy-16-methylene-17α-acetoxy-4-pregnene-3,20-dione in 8 ml. of pyridine. Allow the reaction mixture to remain at room temperature for 6 hours, then at 5° C add 2 ml. additional acetic anhydride and allow the reaction mixture to stand at 5° C for 24 hours. Pour the reaction mixture into water, collect the resultant precipitate by filtration, wash the precipitate with water, then with cold methanol. Dry the precipitate at room temperature in vacuo to obtain 480 mg. of a solid comprising 6β-thiocyanato-7α, 17α-di-acetoxy-16-methylene-4-pregnene-3,20-dione which is used without further purification in following step B.

B. 6-Thiocyanato-16-methylene-17α-acetoxy-4,6-pregnadiene-3,20-dione

To a solution of 50 mg. of 6β-thiocyanato-7α, 17α-di-acetoxy-16-methylene-4-pregnene-3,20-dione in 5 ml. of chloroform, add 12 mg. of p-toluenesulfonic acid. Allow the reaction mixture to remain at room temperature for 3 days. Add water to the reaction mixture and discard the aqueous phase. Wash the organic solution with aqueous sodium bicarbonate, then with water. Dry the chloroform solution over magnesium sulfate, then evaporate to a residue comprising 6-thiocyanato-16-methylene-17α-acetoxy-4,6-pregnadiene-3,20-dione. Purify by preparative thin layer chromatography on silica gel utilizing as developing solvent a mixture of chloroform-ethylacetate (9:1). Yield = 28 mgm.

EXAMPLE 3

Other 6-Thiocyanato-16-methylene-17α-lower alkanoyloxy-4,6-pregnadiene-3,20-diones A. 6β-Thiocyanato-7α-hydroxy-16-methylene-17α-lower alkanoyloxy 4-pregnene-3,20-dione In a manner similar to that described in Example 1A, treat each of the following with potassium thiocyanate in aqueous methanol and in the presence of acetic acid:

6α, 7α-oxido-16-methylene-17α-propionyloxy-4-pregnene-3,20-dione, 6α, 7α-oxido-16-methylene-17α-n-butyryloxy-4-pregnene-3,20-dione, and 6α, 7α-oxido-16-methylene-17α-valeryloxy-4-pregnene-3,20-dione.

Isolate and purify the resultant products in a manner similar to that described in Example 1A to obtain, respectively, 6β-thiocyanato-7α-hydroxy-16-methylene-17α-propionyloxy-4-pregnene-3,20-dione, 6β-thiocyanato-7α-hydroxy-16-methylene-17α-n-butyryloxy-4-pregnene-3,20-dione, and 6β-thiocyanato-7α-hydroxy-16-methylene-17αvaleryloxy-4-pregnene-3,20-dione.

B. 6-Thiocyanato-16-methylene-17α-lower alkanoyloxy-4,6-pregnadiene-3,20-dione

In a manner similar to that described in Example 1B, treat each of the 6β-thiocyanato-7α-hydroxy-16-methylene-17α-lower alkanoyloxyprogesterones prepared in Example 3A with methanesulfonyl chloride in pyridine. Isolate and purify each of the resultant products in a manner similar to that described in Example 1B to obtain, respectively, 6-thiocyanato-16-methylene-17α-propionyloxy-4,6-pregnadiene-3,20-dione, 6-thiocyanato-16-methylene-17α-n-butyryloxy-4,6-pregnadiene-3,20-dione, and 6β-thiocyanato-16-methylene-17α-valeryloxy-4,6-pregnadiene-3,20-dione. Alternatively, the compounds of this invention are prepared according to following procedures C, D and E.

C. 6β-Thiocyanato-7α-acetoxy-16-methylene-17α-lower alkanoyloxy-4-pregnene-3,20-dione In a manner similar to that described in Example 2A, treat each of the 6β-thiocyanato-7α-hydroxy-16-methylene-17α-lower alkanoyloxy-4-pregnene-3,20-diones prepared in Example 2A with acetic anhydride in pyridine. Isolate and purify each of the resultant products in a manner similar to that described in Example 2A to obtain, respectively, 6β-thiocyanato-7α-acetoxy-16-methylene-17α-propionyloxy-4-pregnene-3,20-dione,
6β-thiocyanato-7α-acetoxy-16-methylene-17α-n-butyryloxy-4-pregnene-3,20-dione, and
6β-thiocyanato-7α-acetoxy-16-methylene-17α-valeryloxy-4-pregnene-3,20-dione.

In the above procedure, by utilizing anhydrides of other lower alkanoic acid instead of acetic acid, such as propionic anhydride and n-butyric anhydride, there is obtained the corresponding 7α-lower alkanoate ester, e.g. the corresponding 7α-propionyloxy and 7α-butyryloxy esters of the 6β-thiocyanato-7α-hydroxy-16-methylene-17α-lower alkanoyloxyprogesterone starting compounds.

D. 6-Thiocyanato-16-methylene-17α-lower alkanoyloxy-4,6-pregnadiene-3,20-dione

In a manner similar to that described in Example 2B, treat each of the 6β-thiocyanato-7α-acetoxy-16-methylene-17α-lower alkanoyloxy-4-pregnene-3,20-diones prepared in Example 3C with p-toluenesulfonic acid in chloroform. Isolate and purify each of the resultant products in a manner similar to that described in Example 2B to obtain, respectively, 6-thiocyanato-16-methylene-17α-propionyloxy-4,6-pregnadiene-3,20-dione,
6-thiocyanato-16-methylene-17α-n-butyryloxy-4,6-pregnadiene-3,20-dione, and
6-thiocyanato-16-methylene-17α-valeryloxy-4,6-pregnadiene-3,20-dione.

In the above procedure, in place of the 6β-thiocyanato-7α-acetoxy-16-methylene-17α-lower alkanoyloxy-4-pregnene-3,20-dione intermediates employed therein there may be utilized the corresponding 7α-propionyloxy or 7α-n-butyryloxy ester analogs thereof and there will be obtained the corresponding 6-thiocyanato-17α-lower alkanoyloxy-4,6-pregnadiene. For example, by treating 6β-thiocyanato-7α,17α-propionyloxy-16-methylene-4-pregnene-3,20-dione with p-toluenesulfonic acid in chloroform in the manner of Example 2B, there is obtained 6-thiocyanato-16-methylene-17α-propionyloxy-4,6-pregnadiene-3,20-dione.

I claim:

1. A compound having the following structural formula:

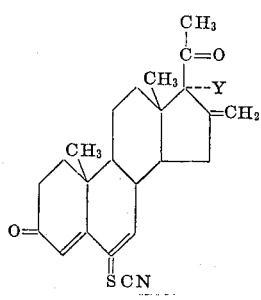

wherein Y is lower alkanoyloxy.

2. A compound according to claim 1 wherein Y is acetoxy, said compound being 6-thiocyanato-16-methylene-17α-acetoxy-4,6-pregnadiene-3,20-dione.

3. A compound having the following structural formula:

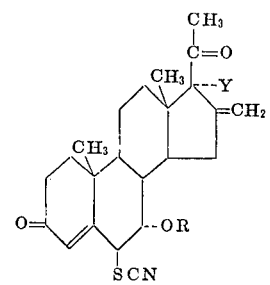

wherein R is a member selected from the group consisting of hydrogen and lower alkanoyl; and Y is lower alkanoyloxy.

4. A compound according to claim 3 wherein R is hydrogen and Y is acetoxy, said compound being 6β-thiocyanato-7α-hydroxy-16-methylene-17α-acetoxy-4-pregnene-3,20-dione.

5. A compound according to claim 3 wherein R is acetyl and Y is acetoxy, said compound being 6β-thiocyanato-7α,17α-diacetoxy-16-methylene-4-pregnene-3,20-dione.

6. A process for preparing 6-thiocyanato-16-methylene-17α-lower alkanoyloxy-4,6-pregnadiene-3,20-diones of the following Formula I:

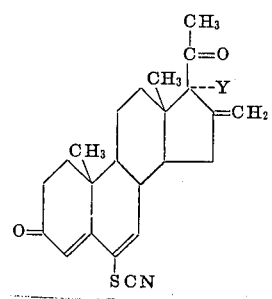

wherein Y is lower alkanoyloxy; which comprises treating a 6β-thiocyanato-7α-hydroxy-4-pregnene-3,20-dione of following Formula A:

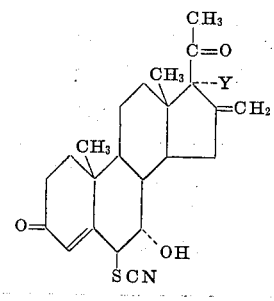

wherein Y is lower alkanoyl;
with a hydrocarbonsulfonyl chloride having up to seven carbon atoms in a tertiary amine.

7. A process according to claim 6 wherein said tertiary amine is pyridine.

8. A process according to claim 6 wherein said hydrocarbonsulfonylchloride is methanesulfonyl chloride, said tertiary amine is pyridine, and said 6β-thiocyanato-4-pregnene-3,20-dione is an intermediate of Formula A wherein Y is acetoxy, said process comprising treating 6β-thiocyanato-7α-hydroxy-16-methylene-17α-acetoxy-4-pregnene-3,20-dione with methanesulfonyl chloride in pyridine to obtain 6-thiocyanato-16-methylene-17α-lower alkanoyloxy-4,6-pregnadiene-3,20-dione.

9. The process for preparing 6-thiocyanato-16-methylene-17α-lower alkanoyloxy-4,6-pregnadiene-3,20-dione which comprises treating 6αα-oxido-16-methylene-17α-lower alkanoyloxy-4-pregnene-3,20-dione with an alkali metal thiocyanate in the presence of a lower alkanoic acid and in a nonreactive, organic solvent, and treating the resulting 6β-thiocyanato-7α-hydroxy-16-methylene-17α-lower alkanoyloxy-4-pregnene-3,20-dione in pyridine with a hydrocarbonsulfonyl chloride having up to seven carbon atoms.

10. The process according to claim 9 wherein said 17α-lower alkanoyloxy is acetoxy, said metal thiocyanate in the presence of a lower alkanoic acid and in a non-reactive, organic solvent is potassium thiocyanate in aqueous methanol in the presence of acetic acid, and wherein said hydrocarbonsulfonyl chloride is methanesulfonyl chloride, said process comprising treating 6α,7α-oxido-16-methylene-17α-acetoxy-4-pregnene-3,20-dione with potassium thiocyanate in aqueous methanol in the presence of acetic acid, and treating the thereby formed 6β-thiocyanato-7α-hydroxy-16-methylene-17 α-acetoxy-4-pregnene-3,20-dione with methanesulfonyl chloride in pyridine whereby is obtained 6-thiocyanato-16-methylene-17α-acetoxy-4,6-pregnadiene-3,20-dione.

11. A process for preparing 6-thiocyanato-16-methylene-17 α-lower alkanoyloxy-4,6-pregnadiene-3,20-diones of the following Formula I:

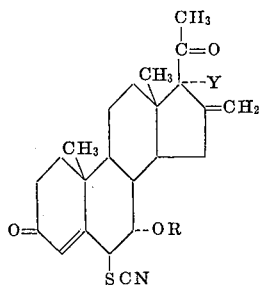

I wherein Y is lower alkanoyloxy;

which comprises treating a 6β-thiocyanato-7α-oxygenated-4-pregnene-3,20-dione of following Formula A:

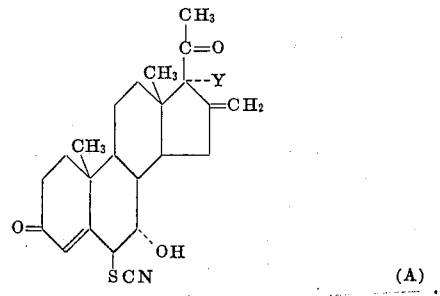

(A)

wherein R is a member selected from the group consisting of hydrogen and lower alkanoyl and wherein Y is lower alkanoyloxy; with an acid reagent selected from the group consisting of p-toluenesulfonic acid and hydrochloric acid in a non-reactive, organic solvent.

* * * * *

UNITED STATES PATENT OFFICE
CERTIFICATE OF CORRECTION

Patent No. 3673223  Dated June 27, 1972

Inventor(s) Elliot L. Shapiro

It is certified that error appears in the above-identified patent and that said Letters Patent are hereby corrected as shown below:

Column 1, line 30, "α-thiocyanato" should read ---β-thiocyanato---. Column 3, line 38, "is the converted" should read ---is then converted---. Column 3, line 43, "present e.g. aqueous" should read ---present (e.g. aqueous---. Column 3, lines 60 and 61 "-7α,17α-diacetoxy acetoxy-" should read ----7α,17α-diacetoxy----. Column 4, line 14, "6-thio cyanato" should read ---6-thiocyanato---. Column 4, lines 19 and 20, "progesterone e.g. 6β-thiocyanato-7α-hydroxy-16-methylene-17β-" should read ---progesterone (e.g. 6β-thiocyanato-7α-hydroxy-16-methylene-17α----. Column 4, line 39, "3,20dione" should read ---3,20-dione---. Column 4, lines 53-56, "and a 6β-thiocyanato-7α-hydroxy-16-methylene-17α-lower alkanoyloxy progesterone and a 6β-thiocyanato-17-bis-lower alkanoyloxy-16-methylene-progesterone with an acid such as hydrochloric acid" should read ---and a 6β-thiocyanato-7α,17α-bis-lower alkanoyloxy-16-methylene-progesterone with an acid such as hydrochloric acid---. Column 4, line 60, "6α-thiocyanato" should read ---6β-thiocyanato---. Column 5, line 64, "λ methanol max 241μ" should read ---λ methanol max 241 mμ---. Column 6, line 57, "-17α valeryloxy" should read ----17α-valeryloxy----. Column 7, line 67, Claim 1 in the formula, at C-6 and C-7 of Ring B,
" 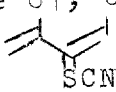 " should appear --- 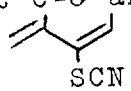 ---.

Column 8, line 73, Claim 9, "6αα-oxido" should read ---6α,7α-oxido----. Column 9, line 29, Claim 11 in formula I at C-6 and C-7 of Ring B, " 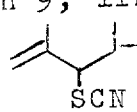—OR" should appear --- 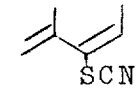 ---.

Signed and sealed this 3rd day of April 1973.

(SEAL)
Attest:

EDWARD M. FLETCHER, JR.
Attesting Officer

ROBERT GOTTSCHALK
Commissioner of Patents